United States Patent
Ishikawa (10) Patent No.: US 7,715,639 B2
(45) Date of Patent: May 11, 2010

(54) DATA ENCODING APPARATUS, DATA DECODING APPARATUS, DATA ENCODING METHOD, DATA DECODING METHOD, AND RECORDING MEDIUM RECORDED WITH PROGRAM

(75) Inventor: Takashi Ishikawa, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 989 days.

(21) Appl. No.: 11/437,498

(22) Filed: May 19, 2006

(65) Prior Publication Data

US 2006/0262859 A1 Nov. 23, 2006

(30) Foreign Application Priority Data

May 20, 2005 (JP) ............... 2005-148427

(51) Int. Cl.
G06K 9/36 (2006.01)
G06K 9/46 (2006.01)
(52) U.S. Cl. .................. 382/238; 382/233; 382/239; 382/245
(58) Field of Classification Search .............. None
See application file for complete search history.

(56) References Cited

U.S. PATENT DOCUMENTS

| | | | | |
|---|---|---|---|---|
| 4,394,774 A | * | 7/1983 | Widergren et al. | 382/250 |
| 4,799,110 A | * | 1/1989 | Hisada et al. | 382/245 |
| 5,089,889 A | * | 2/1992 | Sugiyama | 375/240.12 |
| 5,138,673 A | * | 8/1992 | Yoshida et al. | 382/238 |
| 5,764,374 A | * | 6/1998 | Seroussi et al. | 382/244 |
| 6,028,963 A | * | 2/2000 | Kajiwara | 382/239 |
| 6,229,854 B1 | * | 5/2001 | Kikuchi et al. | 375/240.27 |
| 6,785,422 B2 | * | 8/2004 | Bossen | 382/232 |
| 7,532,765 B2 | * | 5/2009 | Dwyer et al. | 382/251 |
| 2002/0172319 A1 | * | 11/2002 | Chapple et al. | 377/1 |
| 2005/0058437 A1 | * | 3/2005 | Meier et al. | 386/112 |
| 2006/0269147 A1 | * | 11/2006 | Shen et al. | 382/232 |
| 2006/0273937 A1 | * | 12/2006 | Ishikawa | 341/50 |

FOREIGN PATENT DOCUMENTS

| | | | |
|---|---|---|---|
| JP | 06225166 A | * | 8/1994 |
| JP | 09-186883 | | 7/1997 |
| JP | 2001-077699 | | 3/2001 |
| JP | 2001-298739 | | 10/2001 |

* cited by examiner

Primary Examiner—Yubin Hung
Assistant Examiner—Avinash Yentrapati
(74) Attorney, Agent, or Firm—Straub & Pokotylo; John C. Pokotylo

(57) ABSTRACT

This data encoding apparatus includes: a prediction unit for calculating a prediction value of target data using read data; a subtractor for calculating a prediction error value, which is the error between the target data and the prediction value; a filtering unit and a subtractor for performing filtering on the prediction error value relating to the target data and a determined prediction error value, to calculate a corrected prediction error value relating to the target data; an absolute value calculation unit for calculating the absolute value of the corrected prediction error value; a k parameter determination unit for determining the code length of a fixed length code part using the flatness and dynamic range of the absolute corrected prediction error value; and a Golomb-Rice encoding unit for encoding the absolute corrected prediction error value by dividing it into a variable length code part and the fixed length code part.

2 Claims, 10 Drawing Sheets

| ABSOLUTE VALUE DATA | PREDICTION ERROR VALUE |
|---|---|
| 0 | 0 |
| 1 | 1 |
| 2 | -1 |
| 3 | 2 |
| 4 | -2 |
| 5 | 3 |
| 6 | -3 |
| 7 | 4 |
| 8 | -4 |
| 9 | 5 |
| ... | ... |

FIG.16

| FLATNESS DETECTION 1 | | FLATNESS DETECTION 2 | |
|---|---|---|---|
| th1 | 3 | th2 | 15 |
| th_run1 | 2 | th_run2 | 2 |
| k_low1 | 2 | k_low2 | 4 |
| k_high1 | 5 | k_high2 | 5 |

DATA ENCODING APPARATUS, DATA DECODING APPARATUS, DATA ENCODING METHOD, DATA DECODING METHOD, AND RECORDING MEDIUM RECORDED WITH PROGRAM

This application claims benefit of Japanese Application No. 2005-148427 filed in Japan on May 20, 2005, the contents of which are incorporated by this reference.

BACKGROUND OF THE INVENTION

1. Field of the Invention

This invention relates to a data encoding apparatus, a data decoding apparatus, a data encoding method, a data decoding method, and a recording medium recorded with a program, which are used to encode or decode data by dividing the data into a variable length code part and a fixed length code part.

2. Description of Related Art

In an image capturing apparatus such as a digital camera, image capturing data known as RAW data are recorded onto a recording medium in single lens reflex type models and the like, for example. These RAW data are obtained through the implementation of simple analog processing on an image signal obtained from an image capturing element, followed by conversion into digital data. In recent years, the number of pixels in the image capturing element of a digital camera has increased, leading to an increase in the data size of the RAW data. Accordingly, digital cameras which perform compression processing on the RAW data to reduce the size of the data also exist. However, it is assumed that the RAW data will be retouched by a user, and therefore when compression processing is performed, it is desirable that the compression processing be lossless compression.

It is generally desirable for a compression method to have a high compression ratio, but in the case of a compression method applied to an image capturing apparatus such as a digital camera, in contrast to a compression method applied to a single personal computer or the like, several additional requirements, such as the following, for example, arise due to specification limitations and the like.

(1) The processing time should be short.
(2) The buffer amount required for the processing should be small.

Requirement (1) relates to continuous shooting performance, battery consumption, and so on, for example. Requirement (2) relates to the cost, size, weight, and so on of the digital camera.

However, attempts to satisfy both requirement (1) and requirement (2) result in the increased likelihood of a deterioration in the compression performance.

U.S. Pat. No. 5,764,374, for example, may be cited as a compression technique proposed in the prior art. U.S. Pat. No. 5,764,374 proposes a method of classifying conditions according to the gradient of the peripheral pixels of an encoding target pixel and setting a k parameter during Golomb-Rice encoding in the respective conditions.

However, with the technique described in U.S. Pat. No. 5,764,374, a table of the appearance frequency and accumulated error must be created for each condition before calculation processing is performed, leading to an increase in buffer use, and hence the aforementioned requirement (2) is not sufficiently satisfied. Furthermore, the conditions of the peripheral pixels are divided in relation to the encoding target pixel, leading to an increase in processing, and hence requirement (1) is not sufficiently satisfied either.

SUMMARY OF THE INVENTION

An object of this invention is to provide a data encoding apparatus, a data encoding method, and a recording medium recorded with a program, which are capable of achieving a short processing time, a small amount of required memory, and a favorable compression performance.

Another object of this invention is to provide a data decoding apparatus, a data decoding method, and a recording medium recorded with a program, which are capable of decoding compressed data in a short processing time and using a small amount of memory.

Exemplary embodiments consistent with this invention provide a data encoding apparatus comprising: a prediction error value calculator adapted to calculate a prediction error value through adaptive prediction of data; a corrected prediction error value calculator adapted to perform predetermined filtering on a prediction error value relating to target data and a prediction error value determined in the past, in order to calculate a corrected prediction error value in which the prediction error value relating to the target data is corrected; and an encoder adapted to encode the corrected prediction error value by dividing the corrected prediction error value into a variable length code part and a fixed length code part.

Further, exemplary embodiments consistent with this invention provide a data encoding method comprising: calculating a prediction error value through adaptive prediction of data; performing predetermined filtering on a prediction error value relating to target data and a prediction error value determined in the past, in order to calculate a corrected prediction error value in which the prediction error value relating to the target data is corrected; and encoding the corrected prediction error value by dividing the corrected prediction error value into a variable length code part and a fixed length code part.

Further, exemplary embodiments consistent with this invention provide a recording medium recorded with a program for causing a computer to execute a method comprising: calculating a prediction error value through adaptive prediction of data; performing predetermined filtering on a prediction error value relating to target data and a prediction error value determined in the past, in order to calculate a corrected prediction error value in which the prediction error value relating to the target data is corrected; and encoding the corrected prediction error value by dividing the corrected prediction error value into a variable length code part and a fixed length code part.

Exemplary embodiments consistent with this invention provide a data decoding apparatus for decoding encoded data obtained by calculating a prediction error value through adaptive prediction of data, performing predetermined filtering on a prediction error value relating to target data and a prediction error value determined in the past in order to calculate a corrected prediction error value in which the prediction error value relating to the target data is corrected, and encoding the corrected prediction error value by dividing the corrected prediction error value into a variable length code part and a fixed length code part, the data decoding apparatus comprising: a corrected prediction error value decoder adapted to decode the corrected prediction error value by dividing the encoded data into a variable length code part and a fixed length code part in order to decode the encoded data; a reverse filter adapted to perform filtering reverse to the predetermined filtering on the corrected prediction error value decoded by the corrected prediction error value decoder in order to determine the prediction error value; and a target data decoder adapted to determine the target data using the prediction error value determined by the reverse filter.

In addition, exemplary embodiments consistent with this invention provide a data decoding method for decoding encoded data obtained by calculating a prediction error value through adaptive prediction of data, performing predetermined filtering on a prediction error value relating to target data and a prediction error value determined in the past in order to calculate a corrected prediction error value in which the prediction error value relating to the target data is corrected, and encoding the corrected prediction error value by dividing the corrected prediction error value into a variable length code part and a fixed length code part, the data decoding method comprising: determining the corrected prediction error value by dividing the encoded data into a variable length code part and a fixed length code part in order to decode the encoded data; performing filtering reverse to the predetermined filtering on the decoded corrected prediction error value in order to determine the prediction error value; and determining the target data using the determined prediction error value.

Further, exemplary embodiments consistent with this invention provide a recording medium recorded with a program for being executed by a computer to decode encoded data obtained by calculating a prediction error value through adaptive prediction of data, performing predetermined filtering on a prediction error value relating to target data and a prediction error value determined in the past, in order to calculate a corrected prediction error value in which the prediction error value relating to the target data is corrected, and encoding the corrected prediction error value by dividing the corrected prediction error value into a variable length code part and a fixed length code part, the program, which when executed by a computer, performs a method comprising: determining the corrected prediction error value by dividing the encoded data into a variable length code part and a fixed length code part in order to decode the encoded data; performing filtering reverse to the predetermined filtering on the decoded corrected prediction error value in order to determine the prediction error value; and determining the target data using the determined prediction error value.

The above and other objects, features, and advantages of the invention will become more clearly understood from the following description referring to the accompanying drawings.

DETAILED DESCRIPTION OF PREFERRED EMBODIMENT

An embodiment of the present invention will be described below with reference to the drawings.

Figure 1:
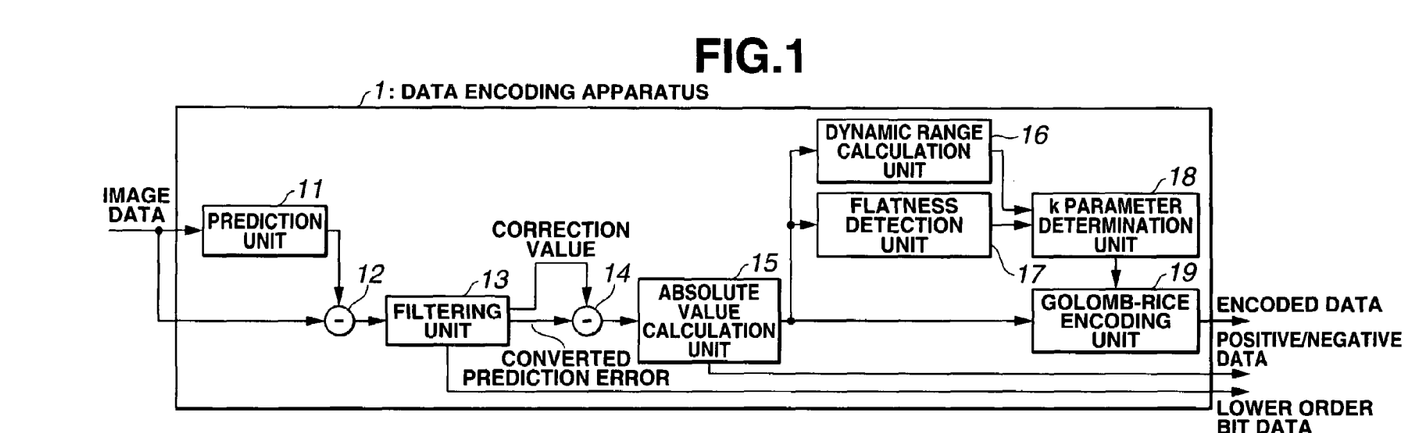
FIG. 1 is a block diagram showing the constitution of a data encoding apparatus according to an embodiment of the present invention.

FIGS. 1 through 16 show an embodiment of the present invention. FIG. 1 is a block diagram showing the constitution of a data encoding apparatus, and FIG. 2 is a block diagram showing the constitution of a data decoding apparatus.

As shown in FIG. 1, a data encoding apparatus 1 is constituted of a prediction unit 11, a subtractor 12, a filtering unit 13, a subtractor 14, an absolute value calculation unit 15, a dynamic range calculation unit 16, a flatness detection unit 17, a k parameter determination unit 18, and a Golomb-Rice encoding unit 19. Image data are input into the prediction unit 11 and subtractor 12, and lower order bit data are output from the filtering unit 13. Positive/negative data are output from the absolute value calculation unit 15, and encoded data are output from the Golomb-Rice encoding unit 19. The data encoding apparatus 1 will be described in further detail below along the description of actions with reference to FIG. 5, FIGS. 7 through 11, and so on.

Figure 2:
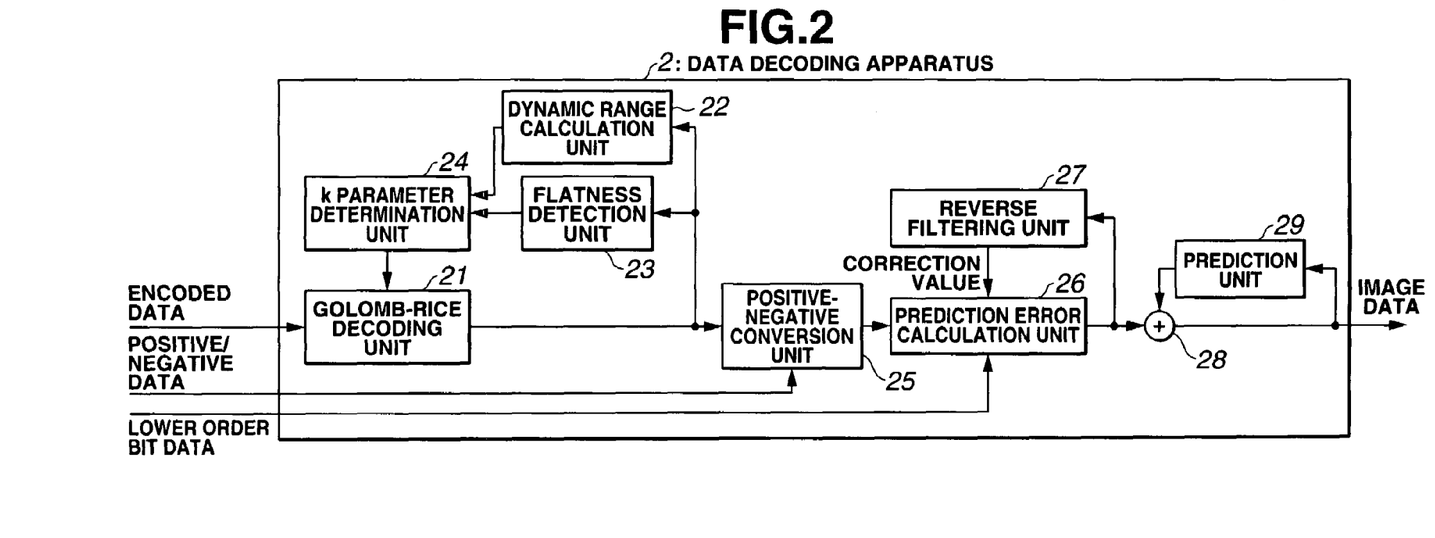
FIG. 2 is a block diagram showing the constitution of a data decoding apparatus in an embodiment.

Data compressed by the data encoding apparatus 1 are decoded by a data decoding apparatus 2 as shown in FIG. 2. The data decoding apparatus 2 is constituted of a Golomb-Rice decoding unit 21, a dynamic range calculation unit 22, a flatness detection unit 23, a k parameter determination unit 24, a positive-negative conversion unit 25, a prediction error calculation unit 26, a reverse filtering unit 27, an adder 28, and a prediction unit 29. The encoded data are input into the Golomb-Rice decoding unit 21, the positive/negative data are input into the positive-negative conversion unit 25, the lower order bit data are input into the prediction error calculation unit 26, and image data are output from the adder 28. The data decoding apparatus 2 will be described in further detail below along the description of actions with reference to FIG. 6, and so on.

Note that in FIGS. 1 and 2, the operation timing of each block is adjusted by a timing adjustment circuit not shown in the drawings.

Figure 3:
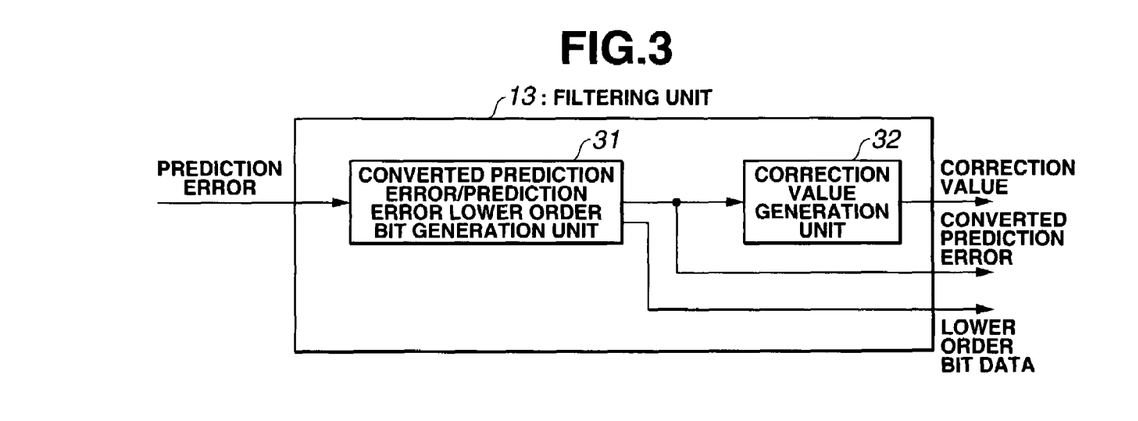
FIG. 3 is a block diagram showing the constitution of a filtering unit in the embodiment.

The filtering unit 13 of the data encoding apparatus 1 is constituted as shown in FIG. 3. FIG. 3 is a block diagram showing the constitution of the filtering unit 13.

The filtering unit 13 is a part of corrected prediction error value calculator, and is constituted of a converted prediction error/prediction error lower order bit generation unit 31 and a correction value generation unit 32. A prediction error value is input into the converted prediction error/prediction error lower order bit generation unit 31, a converted prediction error value and lower order bit data are output from the converted prediction error/prediction error lower order bit generation unit 31, and a correction value is output from the correction value generation unit 32. The filtering unit 13 will be described in detail below along the description of actions.

Figure 4:
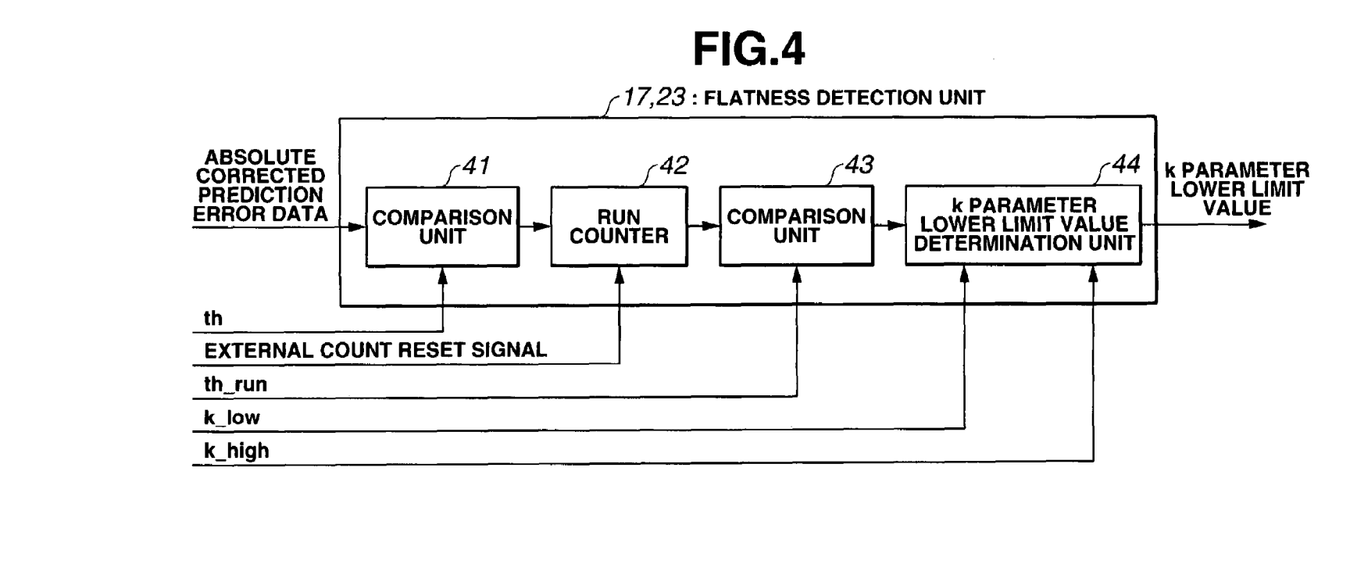
FIG. 4 is a block diagram showing the constitution of a flatness detection unit in the embodiment.

The flatness detection unit 17 of the data encoding apparatus 1 or the flatness detection unit 23 of the data decoding apparatus 2 is constituted as shown in FIG. 4. FIG. 4 is a block diagram showing the constitution of the flatness detection unit.

The flatness detection unit 17, 23 is constituted of a comparison unit 41, a run counter 42, a comparison unit 43, and a k parameter lower limit value determination unit 44. Corrected prediction error data converted to an absolute value and a threshold th are input into the comparison unit 41, an external count reset signal is input into the run counter 42, a threshold th_run is input into the comparison unit 43, and k_low and k_high are input into the k parameter lower limit value determination unit 44.

The actions of the flatness detection unit 17, 23 will also be described in detail below.

Figure 5:
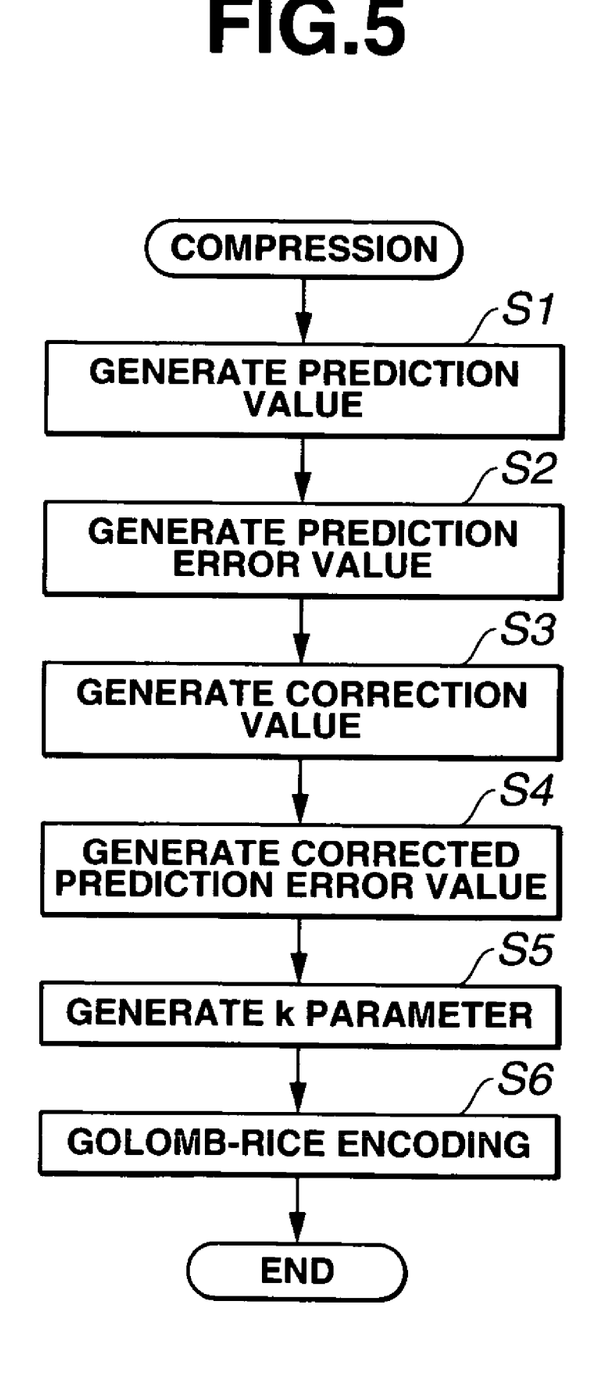
FIG. 5 is a flowchart showing an outline of the flow of compression processing performed by the data encoding apparatus of the embodiment.

FIG. 5 is a flowchart showing an outline of the flow of the compression processing performed by the data encoding apparatus 1.

Compression processing by the data encoding apparatus 1 is basically performed by carrying out a series of processes such as that shown in FIG. 5.

First, pixel data for processing are predicted on the basis of pixel data that have already been read (step S1).

Next, a prediction error value is generated by differentiating the actual value of the pixel data for processing and the prediction value predicted in the step S1 (step S2).

Next, a correction value is generated in a manner to be described below to incorporate the influence of peripheral pixels (step S3), and a corrected prediction error value is generated on the basis of the generated correction value (step S4).

Next, a k parameter indicating the code length of a fixed length code part obtained during Golomb-Rice encoding is determined in accordance with the condition in the neighborhood of the pixel for processing (step S5), and an absolute value of the corrected prediction error value is subjected to Golomb-Rice encoding on the basis of the determined k parameter (step S6). The routine is then terminated.

Figure 7:
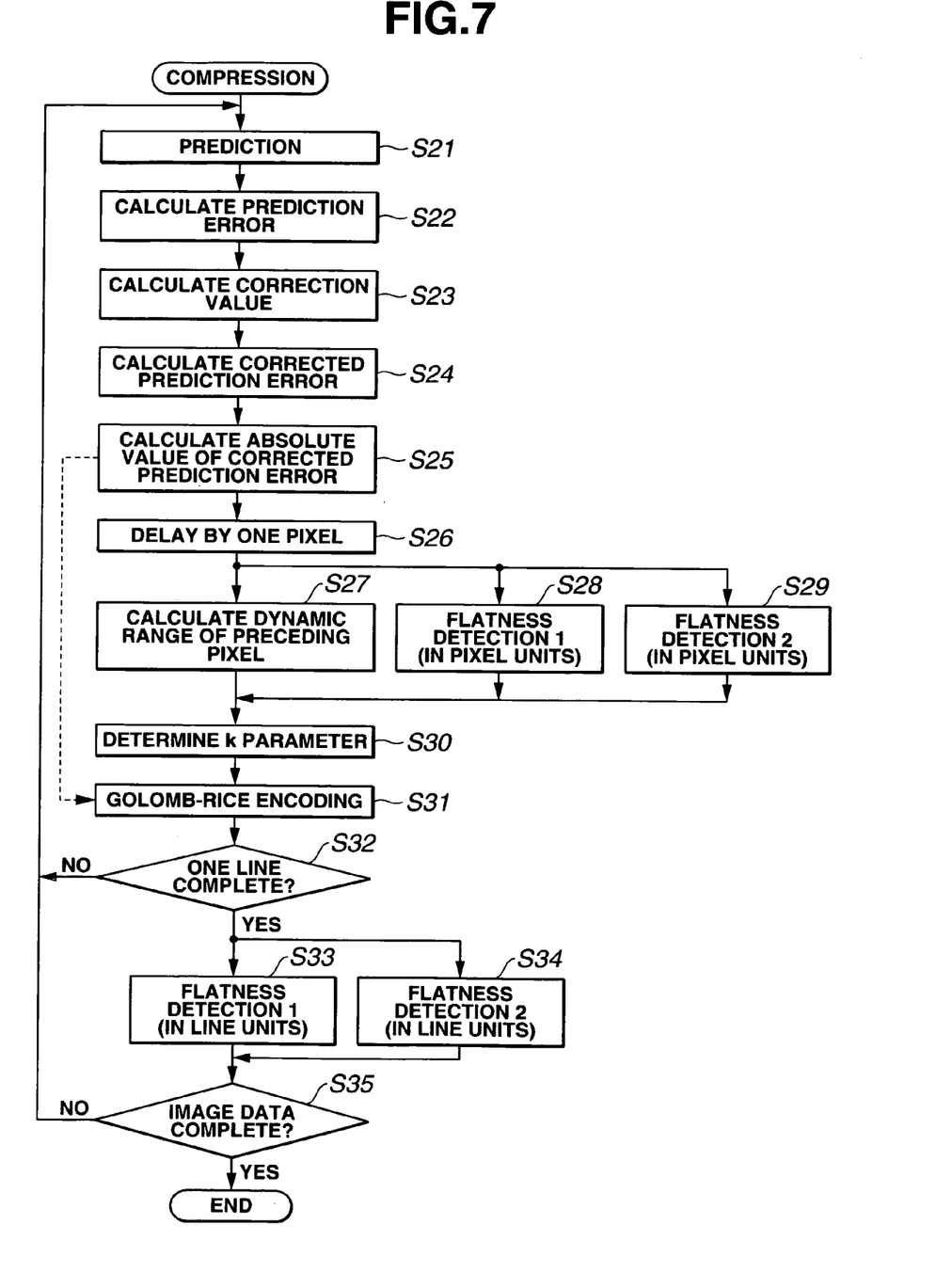
FIG. 7 is a flowchart showing in detail the compression processing performed by the data encoding apparatus of the embodiment.
Figure 8:
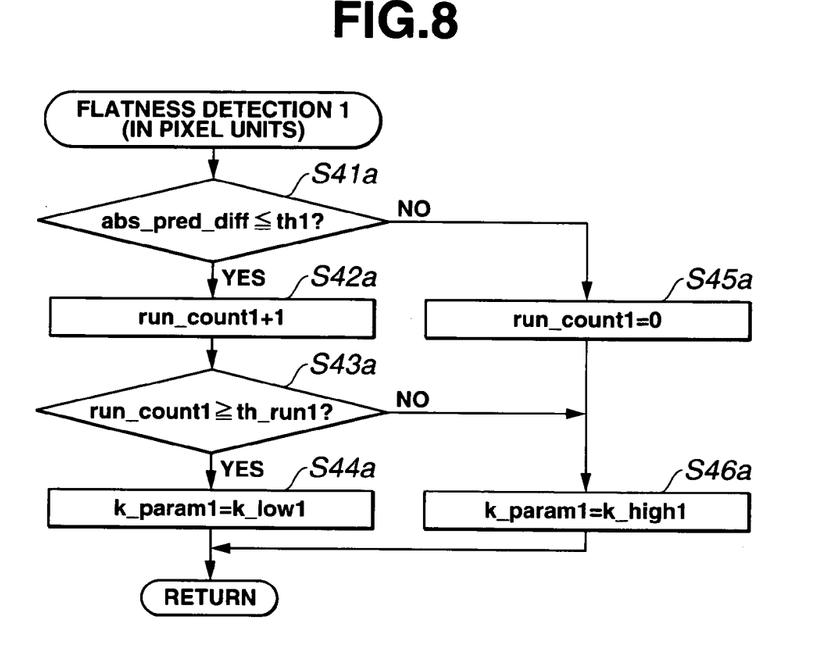
FIG. 8 is a flowchart showing the processing of flatness detection 1, performed in pixel units, in the embodiment.
Figure 9:
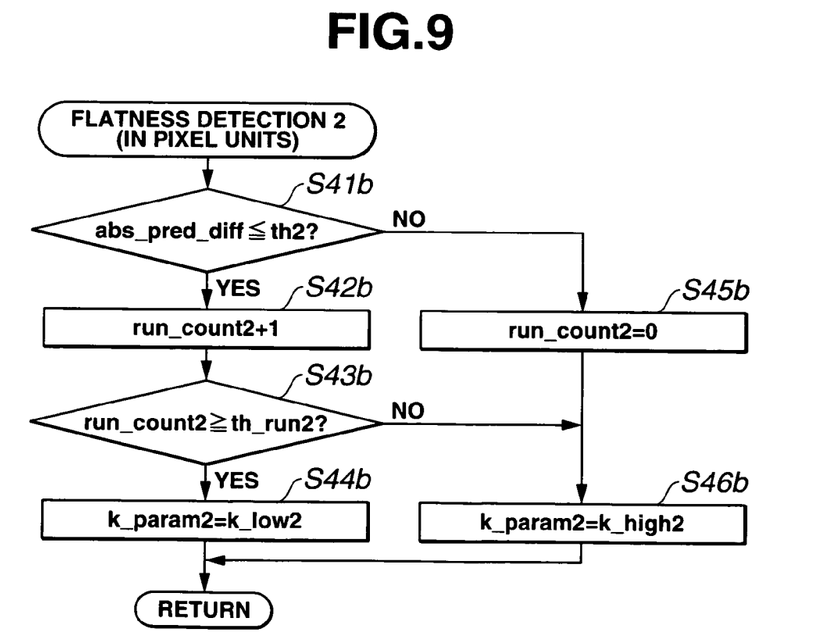
FIG. 9 is a flowchart showing the processing of flatness detection 2, performed in pixel units, in the embodiment.
Figure 10:
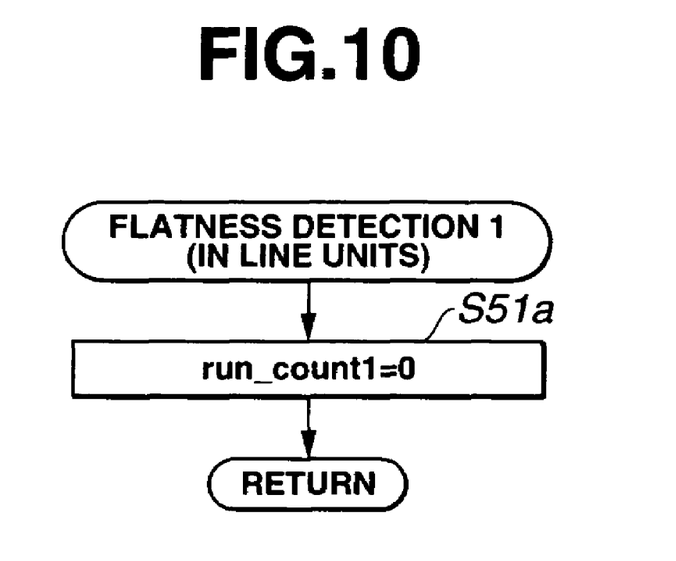
FIG. 10 is a flowchart showing the processing of flatness detection 1, performed in line units, in the embodiment.
Figure 11:
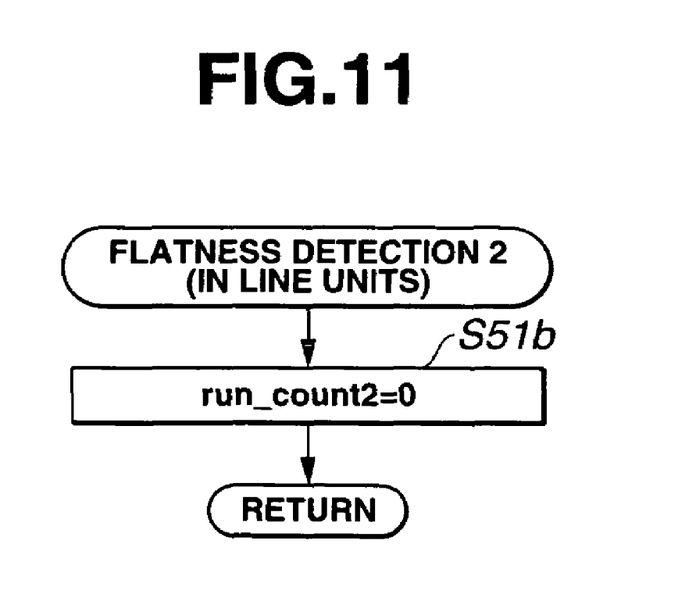
FIG. 11 is a flowchart showing the processing of flatness detection 2, performed in line units, in the embodiment.
Figure 12:
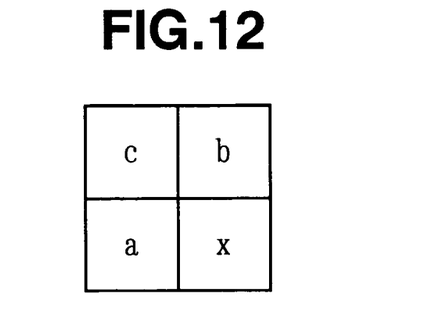
FIG. 12 is a diagram showing the arrangement of a target pixel and neighboring pixels read prior to the target pixel in the embodiment.
Figure 13:
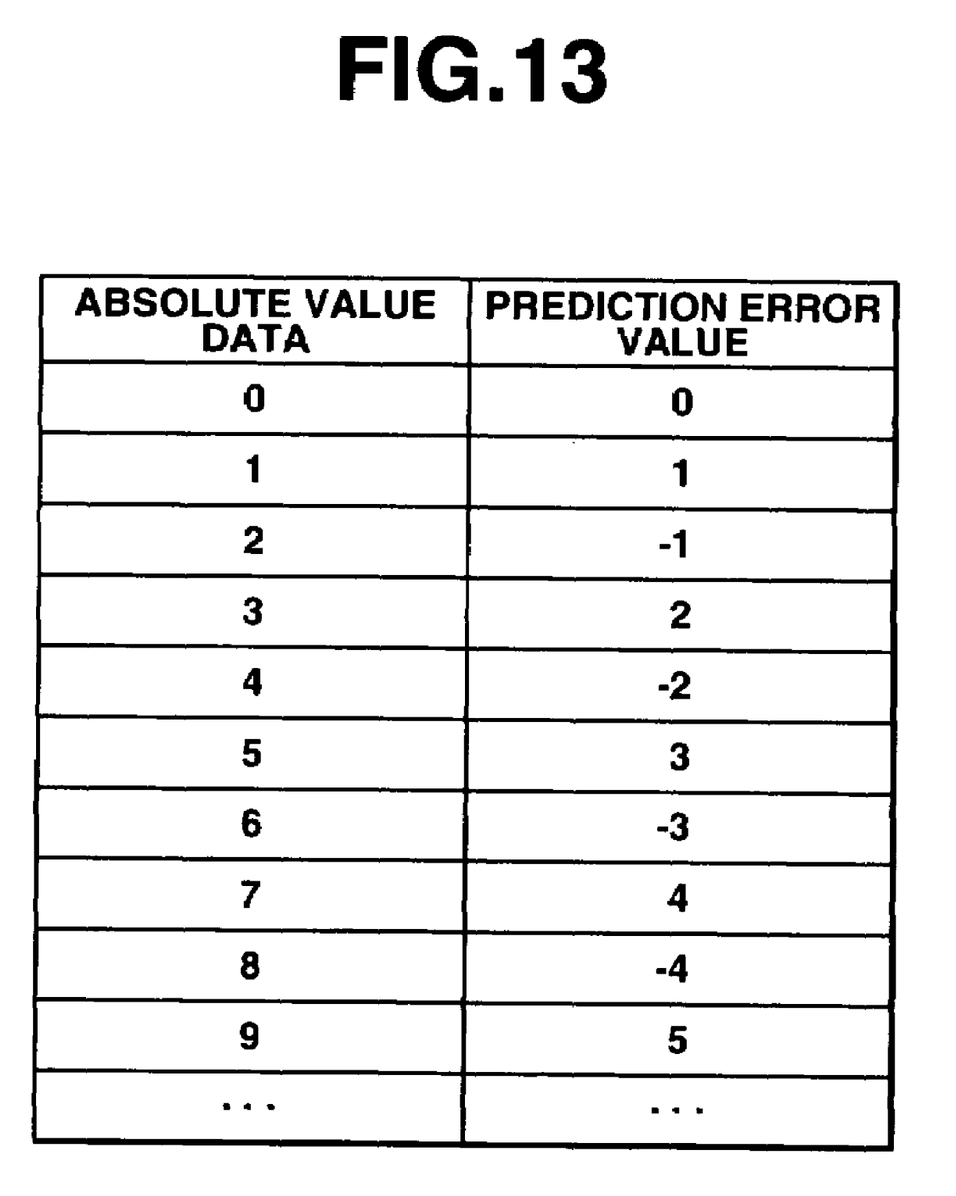
FIG. 13 is a table showing another example of absolute value calculation in the embodiment.
Figure 14:
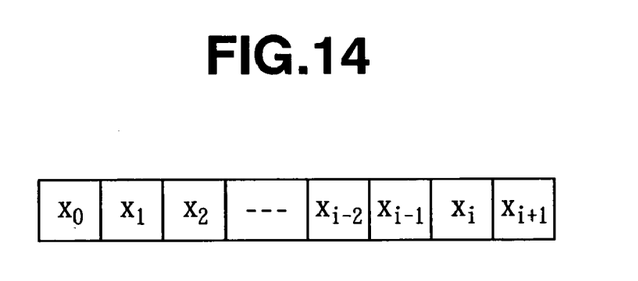
FIG. 14 is a diagram showing image data subjected to processing by the data encoding apparatus of the embodiment.
Figure 15:
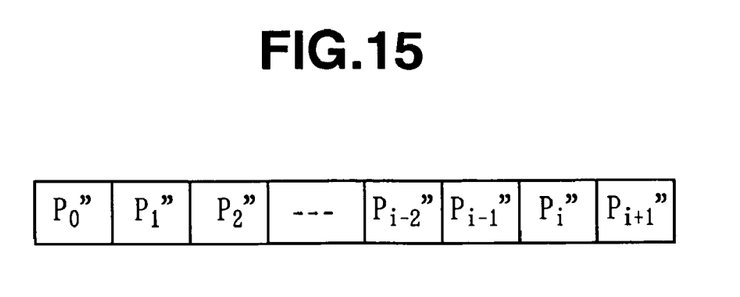
FIG. 15 is a diagram showing corrected prediction error values calculated by the data encoding apparatus of the embodiment.
Figure 16:
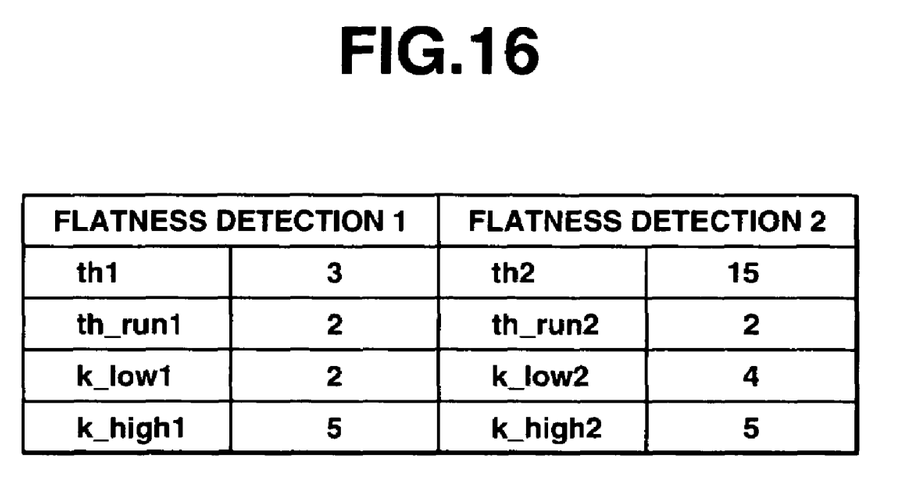
FIG. 16 is a table showing various thresholds and set values used in the pixel-unit flatness detection of the embodiment.

The compression processing performed in this flow will now be described in detail with reference to FIGS. 7 to 16. FIG. 7 is a flowchart showing in detail the compression processing performed by the data encoding apparatus 1, FIG. 8 is a flowchart showing the processing of flatness detection 1 performed in pixel units, FIG. 9 is a flowchart showing the processing of flatness detection 2 performed in pixel units, FIG. 10 is a flowchart showing the processing of flatness detection 1 performed in line units, FIG. 11 is a flowchart showing the processing of flatness detection 2 performed in line units, FIG. 12 is a diagram showing the arrangement of a target pixel and neighboring pixels read prior to the target pixel, FIG. 13 is a table showing another example of absolute value calculation, FIG. 14 is a diagram showing image data subjected to processing by the data encoding apparatus 1, FIG. 15 is a diagram showing corrected prediction error values calculated by the data encoding apparatus 1, and FIG. 16 is a table showing various thresholds. and set values used during flatness detection in pixel units.

To begin this processing, a prediction value is calculated (step S21) (corresponding to the step S1 in FIG. 5). To calculate the prediction value, the pixel value of a target pixel is predicted on the basis of the pixel data that have already been scanned, and here, the values of neighboring pixels of the target pixel are used as shown in FIG. 12. In FIG. 12, the target pixel is denoted by x, the pixel directly to the left of the target pixel is denoted by a, the pixel directly above the target pixel is denoted by b, and the pixel to the upper left of the target pixel is denoted by c. Assuming that the pixel values of the pixels a, b, c are Ra, Rb, Rc, respectively, and that the prediction value of the target pixel x is Px, then the prediction value Px is calculated by the prediction unit 11, which serves as a part of prediction error value calculator, on the basis of the spatial correlation between the pixel data, using a prediction equation such as that shown in Formula 1 below, for example.

$Px = \max(Ra, Rb)$ (when $Rc < \min(Ra, Rb)$)

$Px = \min(Ra, Rb)$ (when $Rc > \max(Ra, Rb)$)

$Px = Ra + Rb - Rc$ (at all other times) [Formula 1]

Here, the symbol max (x, y) on the right side of Formula 1 indicates that either larger value of x and y is taken, while the symbol min (x, y) indicates that either smaller value of x and y is taken. These symbols will be used similarly hereafter.

Note that although a prediction equation suitable for edge detection, such as that shown in Formula 1, is used here, the applicable prediction equation is not limited thereto, and various other prediction equations may be used. For example, the following Formulas 2 to 8 may be cited as other examples of prediction equations. First, in Formula 2, the pixel value Ra of the pixel a directly to the left of the target pixel is set as the prediction value Px of the target pixel x. In so doing, an accurate prediction value can be obtained when the degree of correlation between pixels in the horizontal direction is high.

$Px = Ra$ [Formula 2]

In Formula 3, the pixel value Rb of the pixel b directly above the target pixel is set as the prediction value Px of the target pixel x. In so doing, an accurate prediction value can be obtained when the degree of correlation between pixels in the vertical direction is high.

$Px = Rb$ [Formula 3]

In Formula 4, the pixel value Rc of the pixel c to the upper left of the target pixel is set as the prediction value Px of the target pixel x. In so doing, an accurate prediction value can be obtained when the degree of correlation between pixels in a diagonal direction extending from upper left to lower right is high.

$Px = Rc$ [Formula 4]

In Formula 5, the pixel value Ra of the pixel a directly to the left of the target pixel x is added to the pixel value Rb of the pixel b directly above the target pixel x, the pixel value Rc of the pixel c to the upper left of the target pixel x is subtracted therefrom, and the resulting value is set as the prediction value Px of the target pixel x. In so doing, an accurate prediction value can be obtained when the rate of change in the pixel values of the pixels in the diagonal direction extending from upper left to lower right is regular.

$Px = Ra + Rb - Rc$ [Formula 5]

In Formula 6, a value obtained by subtracting the pixel value Rc of the pixel c to the upper left of the target pixel x from the pixel value Rb of the pixel b directly above the target pixel x and dividing the result by two is added to the pixel value Ra of the pixel a directly to the left of the target pixel x, and the resulting value is set as the prediction value Px of the target pixel x. In so doing, an accurate prediction value can be obtained when the rate of change in the pixel values of the pixels in the horizontal direction has a regularity.

$$Px=Ra+\{(Rb-Rc)/2\} \quad \text{[Formula 6]}$$

In Formula 7, a value obtained by subtracting the pixel value Rc of the pixel c to the upper left of the target pixel x from the pixel value Ra of the pixel a directly to the left of the target pixel x and dividing the result by two is added to the pixel value Rb of the pixel b directly above the target pixel x, and the resulting value is set as the prediction value Px of the target pixel x. In so doing, an accurate prediction value can be obtained when the rate of change in the pixel values of the pixels in the vertical direction has a regularity.

$$Px=Rb+\{(Ra-Rc)/2\} \quad \text{[Formula 7]}$$

In Formula 8, an average value of the pixel value Ra of the pixel a directly to the left of the target pixel x and the pixel value Rb of the pixel b directly above the target pixel x is set as the prediction value Px of the target pixel x. In so doing, an accurate prediction value can be obtained when the degree of correlation with the peripheral pixels is high (when the image is comparatively flat, for example).

$$Px=(Ra+Rb)/2 \quad \text{[Formula 8]}$$

Note that the above prediction formulas are not limited to singular use in relation to a single set of image data, and may be used in combination. More specifically, for example, even when a prediction equation such as that of Formula 2 is employed as the main prediction equation, a prediction equation such as that shown in Formula 3 may be used in combination when the pixel at the left side end of a line is the target pixel such that no pixels exist to the left thereof. Moreover, the prediction equation is not limited to those described above, and the prediction value may be calculated using the pixel data for one or more arbitrary pixels which have been read prior to the target pixel and are close to the target pixel in terms of spatial distance.

It is assumed here that a single line of image data input into the data encoding apparatus 1 is constituted of an array of pixel values such as x0, x1, . . . , xi, xi+1, for example, extending from left to right, as shown in FIG. 14. The pixel value of the target pixel is assumed to be xi, and the prediction value of the target pixel is described as Ri in place of the above Px.

At this time, the subtractor 12, which serves as a part of the prediction error value calculator, calculates a prediction error value Pi by subtracting the prediction value Ri from the actual pixel value xi of the target pixel, as shown in Formula 9 (step S22) (corresponding to the step S2 in FIG. 5)

$$P_i = x_i - R_i \quad \text{[Formula 9]}$$

Further, the converted prediction error/prediction error lower order bit generation unit 31 of the filtering unit 13 calculates a converted prediction error value P'i by dropping (converting to zero) the lower order bit (here, the least significant bit) of the prediction error value Pi, as shown in the following Formula 10.

$$P'_i = \left\lfloor \frac{P_i}{2} \right\rfloor \times 2 \quad \text{[Formula 10]}$$

Here, the parentheses on the right side of Formula 10 are a floor function indicating a maximum integer not exceeding the numeral inside the parentheses. Note that parentheses in this form will be used similarly hereafter to denote a floor function. Further, calculations using a floor function following division by two may be performed on a computer using a right bit shift. Accordingly, the calculation shown in Formula 10 can be performed by combining a right bit shift and a left bit shift. When performing this processing, the randomness of the lower order bit of the prediction error value Pi is high, and therefore the compression efficiency can be enhanced by separating the lower order bit and processing it separately.

Next, the correction value generation unit 32 calculates a correction value Ci using the converted prediction error value P'i by means of a recurrence formula shown in the following Formula 11 (step S23) (corresponding to the step S3 in FIG. 5).

$$C_i = \left\lfloor \frac{P'_i}{2} \right\rfloor + \left\lfloor \frac{C_{i-1}}{2} \right\rfloor \quad \text{[Formula 11]}$$

(where $C_{0-1}=0$)

As is evident from Formula 11, substantially half of the correction value Ci is constituted of the converted prediction error value P'i, and according to the structure of the recurrence formula, substantially ¼ of the correction value Ci is constituted of a converted prediction error value P'i-1, substantially ⅛ of the correction value Ci is constituted of a converted prediction error value P'i-2, and so on. Thus in principle, the Formula 11 is structured as an infinite filter. Accordingly, the correction value Ci includes the converted prediction error value P' (and therefore the prediction error value P) in a progressively smaller proportion as the distance from the target pixel increases, and hence the correction value Ci may be considered as a value which is used to correct a prediction error value calculated only from the adjacent pixel such that the prediction error value is calculated from the pixel values of a plurality of peripheral pixels.

Note that here, the correction value generation unit 32 calculates the correction value Ci using a recurrence formula such as that shown in Formula 11, but the present invention is not limited thereto, and the correction value Ci may be calculated using a formula taking the structure of a finite filter, such as the following Formula 12, for example.

$$C_i = \left\lfloor \frac{P'_i}{2} \right\rfloor + \left\lfloor \frac{P_{i-1}}{2} \right\rfloor \quad \text{[Formula 12]}$$

(where $P'_{o-1}=0$)

The converted prediction error/prediction error lower order bit generation unit 31 also calculates and outputs a prediction error lower order bit PLi, which is the bit dropped from the prediction error value Pi in Formula 10, as shown in the following Formula 13.

$$PL_i = P_i - P'_i \quad \text{[Formula 13]}$$

Further, the subtractor 14, which serves as a part of the corrected prediction error value calculator, calculates a corrected prediction error value P"i (see FIG. 15) by subtracting the correction value Ci from the converted prediction error value P'i as shown in the following Formula 14 (step S24) (corresponding to the step S4 of FIG. 5).

$$P_1'' = P_i' - C_i \quad \text{[Formula 14]}$$

As described above, the correction value Ci includes prediction error value P information relating to the plurality of pixels, and hence the corrected prediction error value P'''i also includes prediction error value P information relating to the plurality of pixels. Accordingly, by substituting the corrected prediction error value P'''i for the prediction error value P, a large value is obtained even when image data having a low degree of spatial correlation (for example, image data having a high degree of randomness or the like) are input, and hence a reduction in the compression ratio can be prevented.

In the following description and in the flowcharts of FIGS. 8 and 9, the corrected prediction error value P'''i calculated in this manner will be referred to as a corrected prediction error value pred_diff.

Next, the absolute value calculation unit 15 calculates the absolute value of the corrected prediction error value pred_diff to obtain an absolute corrected prediction error value abs_pred_diff (step S25) (corresponding to the step S5 and a part of the step S6 in FIG. 5). Various methods exist for calculating the absolute value, and a calculator such as that shown in the following Formula 15 may be cited as an example.

$$abs\_pred\_diff = pred\_diff \text{ (when } pred\_diff \geq 0\text{)}$$

$$abs\_pred\_diff = abs(pred\_diff) - 1 \text{ (when } pred\_diff < 0\text{)} \quad \text{[Formula 15]}$$

Here, the abs ( ) on the right side of the second equation indicates an absolute value.

When the absolute value calculation unit 15 determines the absolute value through calculation such as that shown in Formula 15, data indicating a code (positive/negative data) are output separately as shown in FIG. 1 and so on.

As shown in FIG. 13, the absolute value may also be calculated using a sequential method in which absolute value data of "0" are applied to a prediction error value of "0", absolute value data of "1" are applied to a prediction error value of "1", absolute value data of "2" are applied to a prediction error value of "-1", absolute value data of "3" are applied to a prediction error value of "2", absolute value data of "4" are applied to a prediction error value of "-2", and so on.

Note that the present invention is not limited to these methods, and the absolute value may be calculated using other means.

The absolute corrected prediction error value abs_pred_diff calculated in this manner serves as the data to be subjected to Golomb-Rice encoding, and is used in the processing of a step S31 to be described below and in the following manner to determine the aforementioned k parameter.

In order to perform processing for determining the k parameter, first the absolute corrected prediction error value abs_pred_diff calculated in the manner described above is delayed by one pixel (step S26).

Next, on the basis of the absolute corrected prediction error value abs_pred_diff of the preceding pixel in the scanning sequence, the dynamic range of the preceding pixel is calculated (step S27), flatness detection 1 processing in pixel units is performed on the basis of a comparison with a first threshold (step S28), and flatness detection 2 processing in pixel units is performed on the basis of a comparison with a second threshold (step S29).

Here, calculation of the preceding pixel dynamic range in the step S27 is performed by calculating the bit count of the effective pixel value part of the preceding pixel. More specifically, the dynamic range calculation unit 16, which serves as dynamic range calculating means, detects the pixel value of the preceding pixel one bit at a time from the upper order bit side to the lower order bit side, and first determines the column of bit for which a bit value is not "0"(i.e. a bit value of "1") is obtained. The dynamic range determined at this time is set as pre_range.

The pixel-unit flatness detection 1 processing of the step S28 is performed as shown in FIG. 8.

To begin this processing, the comparison unit 41 determines whether or not the absolute corrected prediction error value $abs\_pred_{13}$ diff is no greater than a predetermined threshold th1 (step S41a).

When the absolute corrected prediction error value abs_pred-diff is no greater than the threshold th1, a run counter run_count1 provided in the run counter 42 is incremented (in FIG. 8, an increment is denoted by the symbol "run_count1+1") (step S42a). The run counter run_count1 is used to indicate the number of pixels, without break, having an absolute corrected prediction error value abs_pred_diff no greater than the threshold th1.

The comparison unit 43 then determines whether or not the run counter run_count1 is equal to or greater than a threshold th_run1 indicating a predetermined run length (step S43a).

When the run counter run_count1 is equal to or greater than the threshold th_run1, the k parameter lower limit value determination unit 44 stores a predetermined k parameter set value k_low1 as a k parameter candidate k_param1 (step S44a).

When it is determined in the step S41a that the absolute corrected prediction error value abs_pred_diff is greater than the predetermined threshold th1, the run counter 42 initializes (i.e. stores "0" in) the run counter run_count1 (step S45a).

When the step S45a is complete or it is determined in the step S43a that the run counter run_count1 is smaller than the thresholdth_run1, the k parameter lower limit value determination unit 44 stores a predetermined k parameter set value k_high1 (here, k_high1>k_low1) as the k parameter candidate kParam1 (step S46a).

Once the step S44a or the step S46a is complete, the routine returns to the processing shown in FIG. 7.

The pixel-unit flatness detection 2 processing of the step S29 is as shown in FIG. 9. In the processing shown in FIG. 9, steps S41b to S46b correspond respectively to the steps S41a to S46a of the processing shown in FIG. 8, with the threshold th1 replaced by a threshold th2 (th2>th1), the run counter run_count1 replaced by a run counter run_count2, the threshold th_run1 indicating a predetermined run length replaced by a threshold th_run2, the predetermined k parameter set value k_low1 replaced by a predetermined k parameter set value k_low2 (k_low2>k_low1), the predetermined k parameter set value k_high1 replaced by a predetermined k parameter set value k_high2 (k_high2>k_low2), and the k parameter candidate k_param1 replaced by a k parameter candidate k_param2.

Note that the various thresholds and set values used in the pixel-unit flatness detection 1 processing shown in FIG. 8 and the pixel-unit flatness detection 1 processing shown in FIG. 9 are set specifically as shown in FIG. 16, for example.

That is, the threshold th1 is "3", the threshold th2 is "15", the threshold th_run1 is "2", the threshold th_run2 is "2", the k parameter set value k_low1 is "2", the k parameter set value k_low2 is "4", the k parameter set value k_high1 is "5", and the k parameter set value k_high2 is "5".

Then, based on the results of the processing performed respectively in the steps 27, S28, and S29, or in other words pre_range calculated in the step 27, k_param1 calculated in the step S28, and k_param2 calculated in the step S29, the k parameter determination unit 18 determines the k parameter k_param as shown in the following Formula 16 (step S30).

$$k\_param = \max(pre\_range, \min(k\_param1, k\_param2)) \quad \text{[Formula 16]}$$

Note that the processing of the steps S26 to S30 described above corresponds to the main parts of the processing of the step S5 in FIG. 5.

Next, on the basis of the calculated k parameter k_param, the Golomb-Rice encoding unit 19, which serves as encoding means, subjects the absolute corrected prediction error value abs_pred_diff determined in the step S25 to Golomb-Rice encoding (step S31) (corresponding to the main parts of the step S6 in FIG. 5). To provide a specific example, when the absolute corrected prediction error value abs_pred_diff is expressed in binary as "00001110110" and the k parameter k_param is "5", the five lower order bits "10110" form the fixed length code part, the remaining upper order bits "000011" are expressed as a decimal "3", and hence the variable length code part is "000", becoming "0001" after the addition of a delimiter "1" to the rear thereof. The parts are then synthesized such that the code obtained through Golomb-Rice encoding is "000110110". Thus eleven-bit information is compressed into nine bits.

Once Golomb-Rice encoding for one pixel is complete, a determination is made as to whether or not the pixel is the final pixel of the line, or in other words whether encoding of a single line is complete (step S32).

When it is determined that the line has not yet been completely encoded, the routine returns to the step S21, where the processing described above is repeated on the following pixel of the same line.

On the other hand, when it is determined in the step S32 that the line has been completely encoded, line-unit flatness detection 1 processing (step S33) (corresponding to a part of the step S5 in FIG. 5) and line-unit flatness detection 2 processing (step S34) (corresponding to a part of the step S5 in FIG. 5) are performed.

As shown in FIG. 10, the line-unit flatness detection 1 processing of the step S33 is performed by having the run counter 42 initialize (i.e. store "0" in) the run counter run_count1 in response to an external count reset signal (step S51a).

Similarly, as shown in FIG. 11, the line-unit flatness detection 2 processing of the step S34 is performed by having the run counter 42 initialize (i.e. store "0" in) the run counter run_count2 in response to an external count reset signal (step S51b).

Once the processing of the steps S33 and S34 is complete, a determination is made as to whether or not all of the lines in the image data have been processed, or in other words whether or not all of the image data have been processed (step S35). If not, the routine returns to the step S21, where the processing described above is repeated on the pixels of the next line.

When it is determined in the step S35 that all of the image data have been processed, the processing ends.

Figure 6:
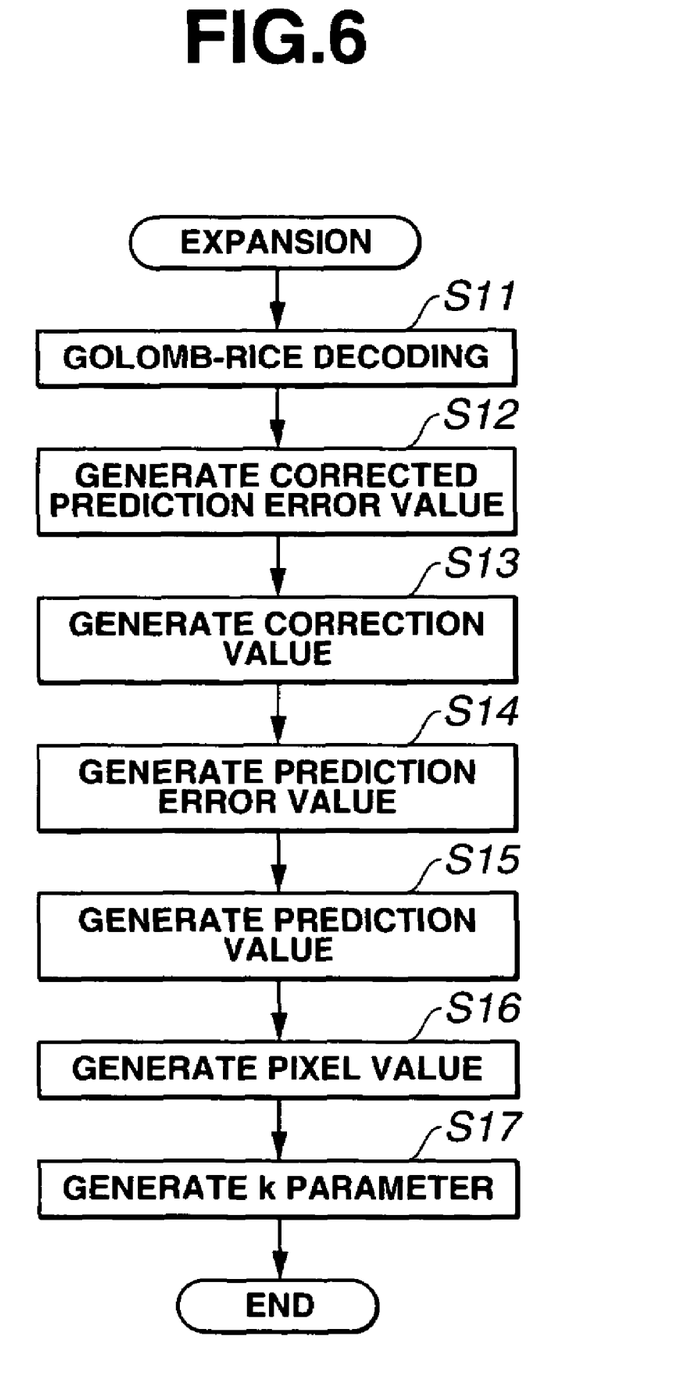
FIG. 6 is a flowchart showing an outline of the flow of expansion processing performed by the data decoding apparatus of the embodiment.

FIG. 6 is a flowchart showing an outline of the flow of expansion processing performed by the data decoding apparatus 2.

To begin this processing, the Golomb-Rice decoding unit 21, which serves as corrected prediction error value decoding means, performs Golomb-Rice decoding using a reverse procedure to that described in the step S31 of FIG. 7, and thereby calculates the absolute corrected prediction error value abs_pred_diff (step S11). Note that the absolute corrected prediction error value abs_pred_diff is also used to determine the k parameter of the next pixel, as will be described below.

Next, the positive-negative conversion unit 25 uses the positive/negative data to calculate the corrected prediction error value pred_diff, i.e. the corrected prediction error value P'''i, from the absolute corrected prediction error value abs_pred_diff (step S12).

Next, the prediction error calculation unit 26, which serves as a part of reverse filtering means, generates the prediction error value Pi using the corrected prediction error value P'''i and the prediction error lower order bit PLi (step S14).

More specifically, first the prediction error calculation unit 26 calculates the converted prediction error value P'i using the following Formula 17.

$$P'_i = 2 \times \left( P''_i + \left\lfloor \frac{C_{i-1}}{2} \right\rfloor \right) \quad \text{[Formula 17]}$$

(where $C_{o-1}=0$)

Here, the correction value $C_{i-1}$ on the right side of Formula 17 is calculated in advance with the aforementioned Formula 11 using the pre-calculated converted prediction error value P'i-1 and the pre-calculated correction value Ci-2 before the reverse filtering unit 27, which serves as a part of the reverse filter, performs the step S14 (step S13).

Note that when the correction value Ci is calculated using the aforementioned Formula 12, the prediction error calculation unit 26 calculates the converted prediction error value P'i using the following Formula 18.

$$P'_i = 2 \times \left( P''_i + \left\lfloor \frac{P'_{i-1}}{2} \right\rfloor \right) \quad \text{[Formula 18]}$$

(where $P'_{o-1}=0$)

The prediction error calculation unit 26 then calculates the prediction error value Pi using the following Formula 19 on the basis of the converted prediction error value P'i, calculated in Formula 17 or Formula 18, and the prediction error lower order bit PLi.

$$P_i = P'_i + PL_i \quad \text{[Formula 19]}$$

Next, the prediction unit 29, which serves as a part of a target data decoder, generates the prediction value Ri (prediction value Px) with any of the above Formulas 1 through 8 using a pixel value that has already been calculated (step S15).

The adder 28, which serves as a part of the target data decoder, then calculates the pixel value xi on the basis of the prediction value Ri and the prediction error value Pi using the following Formula 20 (step S16).

$$x_i = R_i + P_i \quad \text{[Formula 20]}$$

The pixel value xi calculated in this manner serves as the output data of the data decoding apparatus 2.

The absolute corrected prediction error value abs_pred_diff output from the Golomb-Rice decoding unit 21 is delayed by one pixel, whereupon the dynamic range pre_range is calculated as described above by the dynamic range calculation unit 22 and the k parameter candidates k_param1, k_param2 are calculated as described above by the flatness detection unit 23 on the basis of the two thresholds th1, th2. Then, on the basis of these calculation results, the k parameter determination unit 24, which serves as code length setting portion, determines the k parameter as shown in Formula 16 (step S17).

Note that in the above description, image data are cited as an example of data for processing, but needless to say, the data that can be processed by the data encoding apparatus 1 and data decoding apparatus 2 are not limited thereto.

Also in the above description, processing is performed by the data encoding apparatus 1 and data decoding apparatus 2, but processing may be performed by applying the data encoding method and data decoding method to a conventional calculator or the like. Alternatively, a program for performing equivalent processing to that performed by the data encoding apparatus 1 and data decoding apparatus 2 may be recorded onto a recording medium, and a computer may be caused to perform the processing by the program recorded on the recording medium.

Also in the above description, a technique of calculating a corrected prediction error is cited as an example of filtering, but the present invention is not limited thereto, and any filtering technique in which information relating to a plurality of pixels read prior to a target pixel is incorporated into pixel information used to generate a k parameter may be applied.

Also in the above description, Golomb-Rice encoding and Golomb-Rice decoding are cited respectively as examples of encoding and decoding, but the present invention is not limited thereto, and any encoding technique in which data are divided into a variable length code part and a fixed length code part may be applied. Accordingly, the encoding subject is not limited to the absolute value of a corrected prediction error value.

According to the embodiment, a k parameter is predicted using only information relating to the positions of an adjacent pixel (note that information relating to the position of an adjacent pixel includes information relating to the adjacent pixel and information relating to other pixels read prior to the adjacent pixel), and hence the required memory amount can be reduced.

Furthermore, before the k parameter is predicted, filtering is performed to incorporate information relating to neighboring pixels of the adjacent pixel, as well as the information relating to the adjacent pixel, into the information relating to the position of the adjacent pixel. As a result, the precision with which the k parameter is predicted can be increased and an excellent compression performance can be exhibited.

Furthermore, processing performed by combining simple calculations such as addition, subtraction, and bit shifts is used as the filtering, and hence the processing time can be reduced.

In addition, the compressed data can be decoded in a short processing time and using a small amount of memory.

Having described a preferred embodiment of the invention referring to the accompanying drawings, it should be understood that the present invention is not limited to this precise embodiment, and various changes and modifications thereof could be made by one skilled in the art without departing from the spirit or scope of the invention as defined in the appended claims.

What is claimed is:

1. A data encoding apparatus comprising:
    a prediction error value calculator adapted to calculate a prediction error value through adaptive prediction of data;
    a corrected prediction error value calculator adapted to perform predetermined filtering on a prediction error value relating to target data and a prediction error value determined in the past, in order to calculate a corrected prediction error value in which the prediction error value relating to the target data is corrected;
    an encoder adapted to encode the corrected prediction error value by dividing the corrected prediction error value into a variable length code part and a fixed length code part;
    a run counter adapted to determine a number of corrected prediction error values, without break, equal to or lower than a predetermined threshold; and
    code length setting portion adapted to set a code length of the fixed length code part of the corrected prediction error value in accordance with the number detected by the run counter,
    wherein a plurality of threshold types may be set as the threshold,
    wherein, in relation to each of the plurality of set threshold types, the run counter detects the number of corrected prediction error values, without break, equal to or lower than the threshold, and
    wherein when the number detected by the run counter in relation to a first threshold is equal to or higher than a predetermined run length, the code length setting portion sets a first code length to be shorter than a second code length obtained when the number detected by the run counter in relation to a second threshold, which is greater than the first threshold, is equal to or higher than the predetermined run length.

2. The data encoding apparatus according to claim 1, further comprising a dynamic range calculator adapted to detect an effective bit count of the corrected prediction error value as a dynamic range,
    wherein comparing the dynamic range with either smaller one of the first code length and the second code length, the code length setting portion sets the larger one as the code length of the fixed length code part of the corrected prediction error value.

* * * * *